United States Patent
Zhao et al.

(10) Patent No.: US 11,036,075 B2
(45) Date of Patent: Jun. 15, 2021

(54) COLOR FILTER SUBSTRATE AND LIQUID CRYSTAL DISPLAY PANEL

(71) Applicant: WUHAN CHINA STAR OPTOELECTRONICS TECHNOLOGY CO., LTD., Wuhan (CN)

(72) Inventors: Bin Zhao, Wuhan (CN); Fan Lin, Wuhan (CN)

( * ) Notice: Subject to any disclaimer, the term of this patent is extended or adjusted under 35 U.S.C. 154(b) by 216 days.

(21) Appl. No.: 16/466,650

(22) PCT Filed: Feb. 21, 2019

(86) PCT No.: PCT/CN2019/075649
§ 371 (c)(1),
(2) Date: Jun. 5, 2019

(87) PCT Pub. No.: WO2020/107725
PCT Pub. Date: Jun. 4, 2020

(65) Prior Publication Data
US 2020/0348559 A1 Nov. 5, 2020

(30) Foreign Application Priority Data
Nov. 29, 2018 (CN) .......................... 201811447009.1

(51) Int. Cl.
*G02F 1/1335* (2006.01)

(52) U.S. Cl.
CPC .. *G02F 1/133514* (2013.01); *G02F 1/133502* (2013.01); *G02F 1/133512* (2013.01); *G02F 1/133519* (2021.01)

(58) Field of Classification Search
CPC ......... G02F 1/133512; G02F 1/133514; G02F 1/133519; G02F 1/133502; G02F 2201/38
See application file for complete search history.

(56) References Cited

U.S. PATENT DOCUMENTS

2015/0362793 A1* 12/2015 Ishihara ............ G02F 1/133512
349/43

* cited by examiner

*Primary Examiner* — Jessica M Merlin

(57) ABSTRACT

A color filter substrate and a liquid crystal display panel are provided. The color filter substrate includes photoresist blocks spaced apart, a black matrix disposed between adjacent photoresist blocks, an optically thinner medium film disposed on the photoresist blocks and the black matrix, and an overcoat layer covering the photoresist blocks, the black matrix, and the optically thinner medium film. The optically thinner medium film covers a boundary between the photoresist blocks and the black matrix. A refractive index of the optically thinner medium film is less than that of the overcoat layer. The color filter substrate and a TFT array substrate are formed into the liquid crystal display panel. Light is totally reflected at an interface between the overcoat layer and the optically thinner medium film, thereby solving issues of color shifts at large viewing angles without affecting transmittance of the liquid crystal display panel.

15 Claims, 2 Drawing Sheets

COLOR FILTER SUBSTRATE AND LIQUID CRYSTAL DISPLAY PANEL

FIELD OF INVENTION

The present disclosure relates to the field of display technologies, and more particularly to a color filter substrate and a liquid crystal display panel.

BACKGROUND OF INVENTION

With development of display technologies, flat display devices such as liquid crystal displays (LCDs) have gradually replaced cathode ray tube (CRT) display panels due to their high image performance, power saving, thin bodies, and wide applications, are widely used in mobile phones, televisions, personal digital assistants, digital cameras, notebook computers, desktop computers, and other consumer electronic products, and become a mainstream in display devices.

Most of liquid crystal display devices on the market are backlight type liquid crystal display devices, which include a liquid crystal display panel and a backlight module. Working principle of the liquid crystal display panel is to fill liquid crystal molecules between a thin film transistor (TFT) array substrate and a color filter (CF) substrate and apply a driving voltage on the two substrates to control a rotation direction of the liquid crystal molecules to refract light from the backlight module to generate an image.

Referring to FIG. 1, a conventional liquid crystal display panel includes a color filter substrate 100 and a TFT array substrate 200 disposed opposite to each other. The color filter substrate 100 includes a substrate 110, a plurality of spaced photoresist blocks 120 disposed on a side of the substrate 110 adjacent to the TFT array substrate 200, a black matrix (BM) 130 disposed on a side of the substrate 110 adjacent to the TFT array substrate 200 and disposed between adjacent photoresist blocks 120, and an overcoat (OC) layer 140 disposed on a side of the photoresist block 120 and the black matrix 130 adjacent to the TFT array substrate 200. The photoresist blocks 120 include a red photoresist block 121, a green photoresist block 122, and a blue photoresist block 123 that are sequentially disposed. The TFT array substrate 200 includes a plurality of pixel units 210 respectively corresponding to the photoresist blocks 120. Ideally, assembly of the color filter substrate and the TFT array substrate is required to make each photoresist block coincide with the corresponding pixel unit. However, in actual production, the TFT array substrate and the color filter substrate may not completely overlap, for example, FIG. 1 illustrates that the photoresist block 120 and the corresponding pixel unit 210 are partially offset, which may cause issues of color shifts at large viewing angles. For example, when a user views the liquid crystal display panel at a viewing angle of 45°, most of light emitted by a backlight module passes through the pixel unit 210 corresponding to the red photoresist block 121 and then enters the red photoresist block 121. However, a small portion of the light enters the green photoresist block 122 adjacent to the red photoresist block 121, such that the light finally reaching human eyes includes most of red light and a small portion of green light, and the light finally appears yellow light, and this causes a reddish-yellow color shift. With continuous development of display technologies, consumers' requirements for transmittance of display panels are constantly increasing, and the most commonly used method for increasing an aperture ratio thereof is to reduce a size of the black matrix of the color filter substrate, and the smaller the size of the black matrix, the more serious the phenomenon of color shift at large viewing angles. In the prior art, it is difficult to solve the issues of color shifts at large viewing angles while ensuring high transmittance of the liquid crystal display panel.

SUMMARY OF INVENTION

An object of the present disclosure is to provide a color filter substrate capable of solving issues of color shifts at large viewing angles of a liquid crystal display panel while ensuring transmittance of the liquid crystal display panel.

Another object of the present disclosure is to provide a liquid crystal display panel capable of solving issues of color shifts at large viewing angles while having a high transmittance.

In order to achieve the above object, an embodiment of the present disclosure provides a color filter substrate. The color filter substrate includes a plurality of photoresist blocks spaced apart from each other, a black matrix disposed between adjacent photoresist blocks, an optically thinner medium film disposed on the photoresist blocks and the black matrix, and an overcoat layer covering the photoresist blocks, the black matrix, and the optically thinner medium film. The optically thinner medium film covers a boundary between the photoresist blocks and the black matrix. A refractive index of the optically thinner medium film is less than a refractive index of the overcoat layer.

In an embodiment of the present disclosure, the refractive index of the optically thinner medium film satisfies: $n = n_{OC} \times \sin i_{incidence}$, wherein n is the refractive index of the optically thinner medium film, $n_{OC}$ is the refractive index of the overcoat layer, and $i_{incidence}$ is a preset incident critical angle.

In an embodiment of the present disclosure, the refractive index of the overcoat layer ranges between 1.5 and 1.6.

In an embodiment of the present disclosure, the refractive index of the overcoat layer is 1.55.

In an embodiment of the present disclosure, the photoresist blocks include a red photoresist block, a green photoresist block, and a blue photoresist block disposed in sequence.

In an embodiment of the present disclosure, the color filter substrate further includes a substrate, the photoresist blocks and the black matrix are disposed on a same side of the substrate, and the optically thinner medium film is disposed on a side of the photoresist blocks and the black matrix away from the substrate.

In an embodiment of the present disclosure, material of the substrate includes glass or a transparent flexible material.

In an embodiment of the present disclosure, material of the black matrix includes a black photoresist material.

In an embodiment of the present disclosure, material of the overcoat layer includes a transparent photoresist material.

An embodiment of the present disclosure further provides a color filter substrate. The color filter substrate includes a plurality of photoresist blocks spaced apart from each other, a black matrix disposed between adjacent photoresist blocks, an optically thinner medium film disposed on the photoresist blocks and the black matrix, an overcoat layer covering the photoresist blocks, the black matrix, and the optically thinner medium film, and a substrate. The optically thinner medium film covers a boundary between the photoresist blocks and the black matrix. The photoresist blocks and the black matrix are disposed on a same side of the substrate, and the optically thinner medium film is disposed on a side of the photoresist blocks and the black matrix away from the substrate. A refractive index of the optically thinner medium film is less than a refractive index of the overcoat layer. The refractive index of the optically thinner medium film satisfies: $n=n_{OC} \times \sin i_{incidence}$, wherein n is the refractive index of the optically thinner medium film, $n_{oc}$ is the refractive index of the overcoat layer, and $i_{incidence}$ is a preset incident critical angle.

An embodiment of the present disclosure further provides a liquid crystal display panel including the above color filter substrate.

Beneficial effects of the embodiment of present disclosure are that, the embodiment of the present disclosure provides the color filter substrate and the liquid crystal display panel. The color filter substrate includes the photoresist blocks spaced apart from each other, the black matrix disposed between adjacent photoresist blocks, the optically thinner medium film disposed on the photoresist blocks and the black matrix, and the overcoat layer covering the photoresist blocks, the black matrix, and the optically thinner medium film. The optically thinner medium film covers the boundary between the photoresist blocks and the black matrix. The refractive index of the optically thinner medium film is less than the refractive index of the overcoat layer. The color filter substrate and a TFT array substrate are formed into the liquid crystal display panel. When viewed from large viewing angles, light from the pixel unit is incident on the photoresist block adjacent to the photoresist block corresponding to the pixel unit, and the light is totally reflected at an interface between the overcoat layer and the optically thinner medium film, thereby solving issues of color shifts at large viewing angles without affecting transmittance of the liquid crystal display panel. The liquid crystal display panel of the embodiment is capable of solving issues of color shifts at large viewing angles while having a high transmittance.

DESCRIPTION OF DRAWINGS

In order to further understand the features and technical contents of the present invention, refer to the following detailed description and drawings related to the present disclosure. The drawings are provided for reference and description only and are not intended to limit the present disclosure.

DETAILED DESCRIPTION OF PREFERRED EMBODIMENTS

In order to further illustrate the technical means and effects of the present disclosure, the following detailed description will be made in conjunction with the preferred embodiments of the present disclosure and the accompanying drawings.

Figure 1:
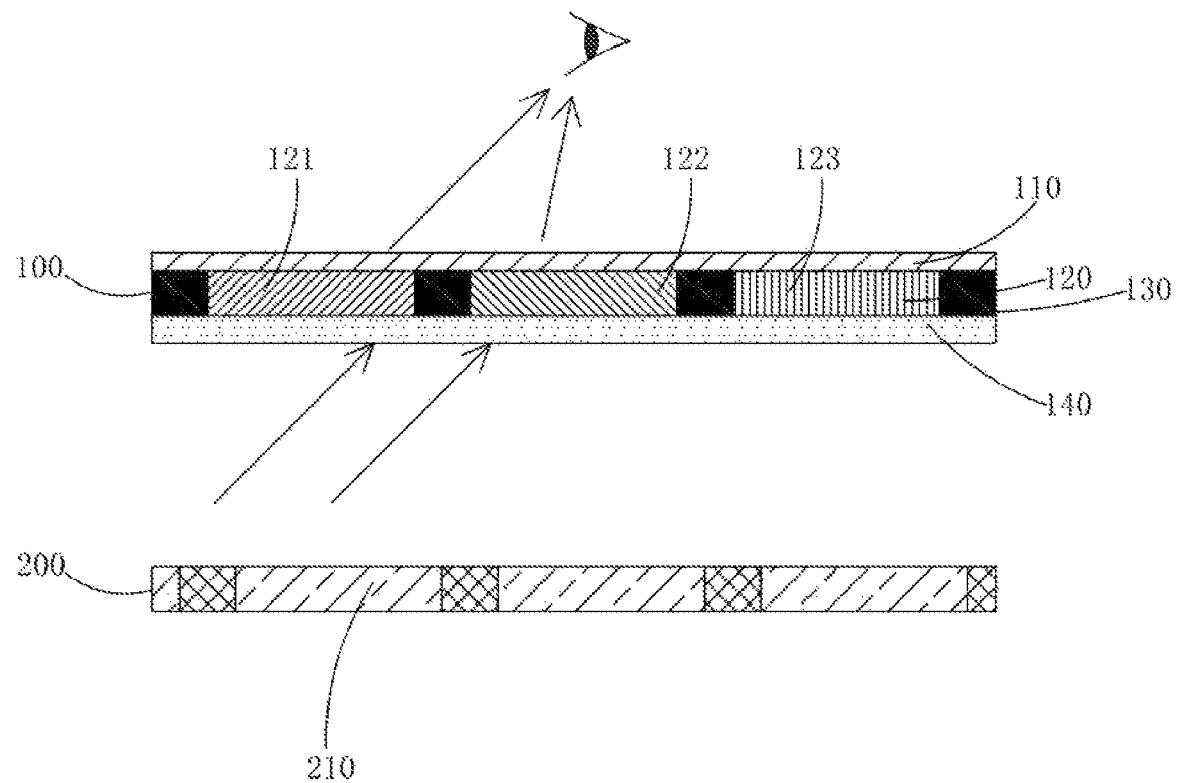
FIG. 1 is a schematic structural diagram of a conventional liquid crystal display panel.
Figure 2:
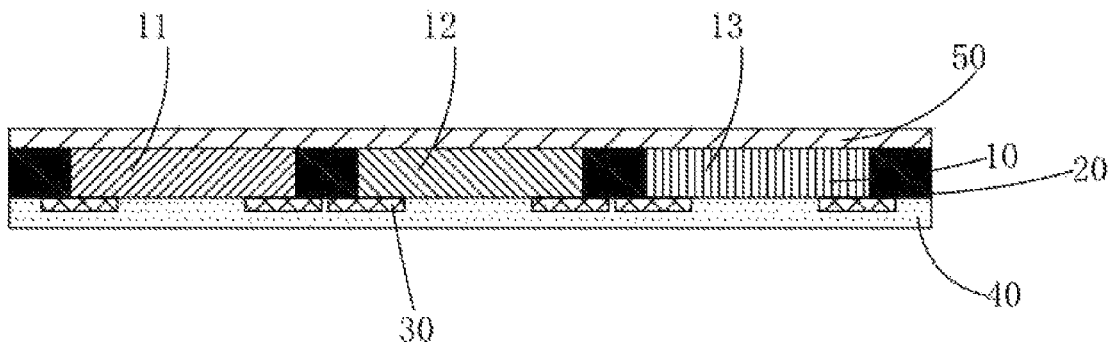
FIG. 2 is a schematic structural diagram of a color filter substrate according to an embodiment of the present disclosure.

Referring to FIG. 2, the embodiment of the present disclosure provides a color filter substrate. The color filter substrate includes a plurality of photoresist blocks 10 spaced apart from each other, a black matrix 20 disposed between adjacent photoresist blocks 10, an optically thinner medium film 30 disposed on the photoresist blocks 10 and the black matrix 20, and an overcoat layer 40 covering the photoresist blocks 10, the black matrix 20, and the optically thinner medium film 30. The optically thinner medium film 30 covers a boundary between the photoresist blocks 10 and the black matrix 20. It is important to note that a refractive index of the optically thinner medium film 30 is less than a refractive index of the overcoat layer 40.

In details, the refractive index of the optically thinner medium film 30 satisfies: $n=n_{OC} \times \sin i_{incidence}$, wherein n is the refractive index of the optically thinner medium film 30, $n_{oc}$ is the refractive index of the overcoat layer 40, and $i_{incidence}$ is a preset incident critical angle.

In details, the refractive index of the overcoat layer 40 ranges between 1.5 and 1.6.

In details, the refractive index of the overcoat layer 40 is 1.55.

In details, the photoresist blocks 10 include a red photoresist block 11, a green photoresist block 12, and a blue photoresist block 13 disposed in sequence.

In details, the color filter substrate further includes a substrate 50. The photoresist blocks 10 and the black matrix 20 are disposed on a same side of the substrate 50. The optically thinner medium film 30 is disposed on a side of the photoresist blocks 10 and the black matrix 20 away from the substrate 50.

In details, material of the substrate 50 includes glass or a transparent flexible material.

In details, material of the black matrix 20 includes a black photoresist material.

In details, material of the overcoat layer 40 includes a transparent photoresist material.

It is understood that, in the color filter substrate of the embodiment of the present disclosure, the optically thinner medium film 30 is disposed on the photoresist blocks 10 and the black matrix 20, and the optically thinner medium film 30 covers the boundary between the photoresist blocks 10 and the black matrix 20. The overcoat layer 40 covers the photoresist blocks 10, the black matrix 20, and the optically thinner medium film 30, and the refractive index of the optically thinner medium film 30 is less than the refractive index of the overcoat layer 40. Therefore, referring to FIG. 3, after the color filter substrate of the embodiment of the present disclosure and a thin film transistor (TFT) array substrate 9 are assembled to form a liquid crystal display panel, even if the TFT array substrate 9 and the color filter substrate are offset, such that pixel units 91 on the TFT array substrate 9 and corresponding photoresist blocks 10 of the color filter substrate do not completely coincide. When viewing the liquid crystal display panel through large viewing angles, light from the pixel unit 91 is incident on the photoresist block 10 adjacent to the photoresist block 10 corresponding to the pixel unit 91, and the light is totally reflected at an interface between the overcoat layer 40 and the optically thinner medium film 30. Therefore, when viewed from large viewing angles, the light emitted by each pixel unit 91 can only enter human eyes through the corresponding photoresist blocks 10, thereby eliminating a need to increase a size of the black matrix 20, that is, issues of color shifts at large viewing angles are solved without affecting transmittance of the liquid crystal display panel, thereby improving a performance of the liquid crystal display panel.

Figure 3:
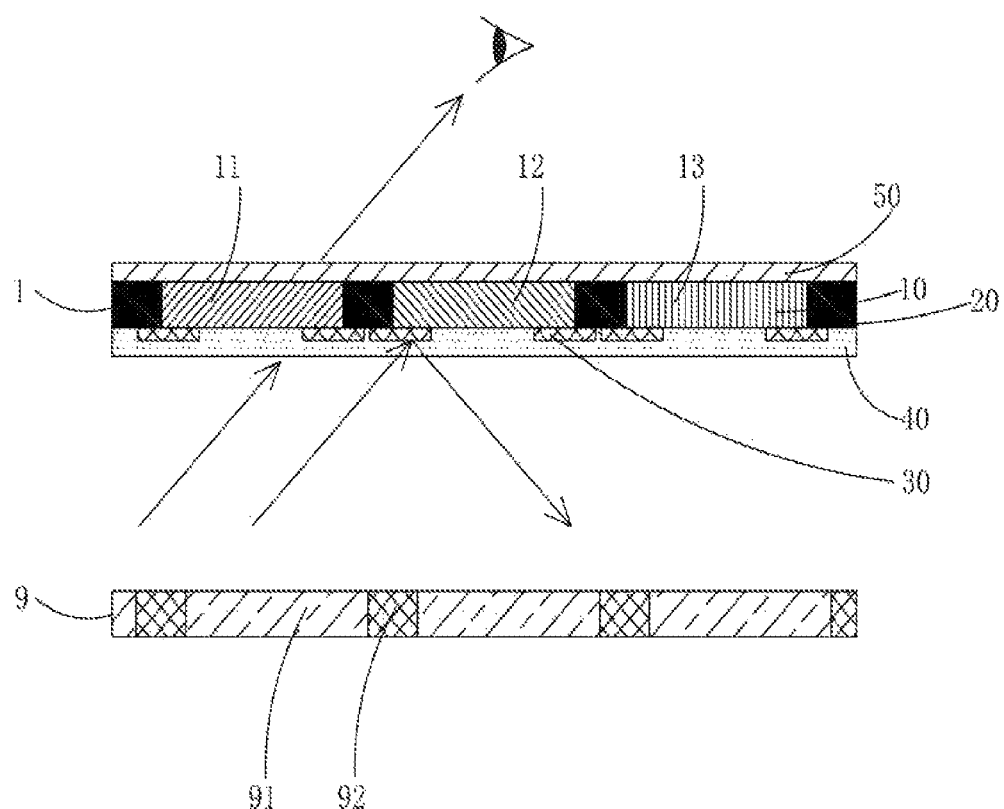
FIG. 3 is a schematic structural diagram of a liquid crystal display panel according to an embodiment of the present disclosure.

Referring to FIG. 3, an embodiment of the present disclosure further provides a liquid crystal display panel including a color filter substrate 1, a TFT array substrate 9 disposed opposite to the color filter substrate 1, and a liquid crystal layer (not shown) disposed between the color filter substrate 1 and the TFT array substrate 9.

In details, the color filter substrate 1 includes a plurality of photoresist blocks 10 spaced apart from each other, a black matrix 20 disposed between adjacent photoresist blocks 10, an optically thinner medium film 30 disposed on the photoresist blocks 10 and the black matrix 20, and an overcoat layer 40 covering the photoresist blocks 10, the black matrix 20, and the optically thinner medium film 30. The optically thinner medium film 30 covers a boundary between the photoresist blocks 10 and the black matrix 20. It is important to note that a refractive index of the optically thinner medium film 30 is less than a refractive index of the overcoat layer 40.

In details, the refractive index of the optically thinner medium film 30 satisfies: $n=n_{OC} \times \sin i_{incidence}$, wherein n is the refractive index of the optically thinner medium film 30, $n_{oc}$ is the refractive index of the overcoat layer 40, and $i_{incidence}$ is a preset incident critical angle.

In details, the refractive index of the overcoat layer 40 ranges between 1.5 and 1.6.

In details, the refractive index of the overcoat layer 40 is 1.55.

In details, the photoresist blocks 10 include a red photoresist block 11, a green photoresist block 12, and a blue photoresist block 13 disposed in sequence.

In details, the color filter substrate further includes a substrate 50. The photoresist blocks 10 and the black matrix 20 are disposed on a same side of the substrate 50. The optically thinner medium film 30 is disposed on a side of the photoresist blocks 10 and the black matrix 20 away from the substrate 50.

In details, material of the substrate 50 includes glass or a transparent flexible material.

In details, material of the black matrix 20 includes a black photoresist material.

In details, material of the overcoat layer 40 includes a transparent photoresist material.

In details, the TFT array substrate 9 includes a plurality of pixel units 91 arranged at intervals, and each of the pixel units 91 corresponds to one photoresist block 10 of the color filter substrate 1.

Further, the TFT array substrate 9 includes an array-side light shielding region 92 disposed between adjacent pixel units 91.

It is understood that, in the color filter substrate of the embodiment of the present disclosure, the optically thinner medium film 30 is disposed on the photoresist blocks 10 and the black matrix 20, and the optically thinner medium film 30 covers the boundary between the photoresist blocks 10 and the black matrix 20. The overcoat layer 40 covers the photoresist blocks 10, the black matrix 20, and the optically thinner medium film 30, and the refractive index of the optically thinner medium film 30 is less than the refractive index of the overcoat layer 40. Even if the TFT array substrate 9 and the color filter substrate 1 are offset, such that pixel units 91 on the TFT array substrate 9 and corresponding photoresist blocks 10 of the color filter substrate 1 do not completely coincide. When viewing the liquid crystal display panel through large viewing angles, light from the pixel unit 91 is incident on the photoresist block 10 adjacent to the photoresist block 10 corresponding to the pixel unit 91, and the light is totally reflected at an interface between the overcoat layer 40 and the optically thinner medium film 30. Therefore, when viewed from large viewing angles, the light emitted by each pixel unit 91 can only enter human eyes through the corresponding photoresist blocks 10, thereby eliminating a need to increase a size of the black matrix 20, that is, issues of color shifts at large viewing angles are solved without affecting transmittance of the liquid crystal display panel, thereby improving a performance of the liquid crystal display panel.

In summary, the color filter substrate of the embodiment includes the photoresist blocks spaced apart from each other, the black matrix disposed between adjacent photoresist blocks, the optically thinner medium film disposed on the photoresist blocks and the black matrix, and the overcoat layer covering the photoresist blocks, the black matrix, and the optically thinner medium film. The optically thinner medium film covers the boundary between the photoresist blocks and the black matrix. The refractive index of the optically thinner medium film is less than the refractive index of the overcoat layer. The color filter substrate and a TFT array substrate are formed into the liquid crystal display panel. When viewed from large viewing angles, light from the pixel unit is incident on the photoresist block adjacent to the photoresist block corresponding to the pixel unit, and the light is totally reflected at an interface between the overcoat layer and the optically thinner medium film, thereby solving issues of color shifts at large viewing angles without affecting transmittance of the liquid crystal display panel. The liquid crystal display panel of the embodiment is capable of solving issues of color shifts at large viewing angles while having a high transmittance.

In the above, various other corresponding changes and modifications can be made by those skilled in the art according to the technical solutions and technical concept of the present disclosure, and all such changes and modifications are within the scope of the claims of the present disclosure.

What is claimed is:

1. A color filter substrate, comprising:
   a plurality of photoresist blocks spaced apart from each other;
   a black matrix disposed between adjacent photoresist blocks;
   an optically thinner medium film disposed on the photoresist blocks and the black matrix; and
   an overcoat layer covering the photoresist blocks, the black matrix, and the optically thinner medium film;
   wherein the optically thinner medium film covers a boundary between the photoresist blocks and the black matrix; and
   wherein a refractive index of the optically thinner medium film is less than a refractive index of the overcoat layer.

2. The color filter substrate according to claim 1, wherein the refractive index of the optically thinner medium film satisfies: $n=n_{OC} \times \sin i_{incidence}$, wherein n is the refractive index of the optically thinner medium film, $n_{oc}$ is the refractive index of the overcoat layer, and $i_{incidence}$ is a preset incident critical angle.

3. The color filter substrate according to claim 2, wherein the refractive index of the overcoat layer ranges between 1.5 and 1.6.

4. The color filter substrate according to claim 3, wherein the refractive index of the overcoat layer is 1.55.

5. The color filter substrate according to claim 1, wherein the photoresist blocks comprise a red photoresist block, a green photoresist block, and a blue photoresist block disposed in sequence.

6. The color filter substrate according to claim 1, further comprising a substrate, wherein the photoresist blocks and the black matrix are disposed on a same side of the substrate, and the optically thinner medium film is disposed on a side of the photoresist blocks and the black matrix away from the substrate.

7. The color filter substrate according to claim 6, wherein material of the substrate comprises glass or a transparent flexible material.

8. The color filter substrate according to claim 1, wherein material of the black matrix comprises a black photoresist material.

9. The color filter substrate according to claim 1, wherein material of the overcoat layer comprises a transparent photoresist material.

10. A liquid crystal display panel comprising the color filter substrate according to claim 1.

11. A color filter substrate, comprising:
a plurality of photoresist blocks spaced apart from each other;
a black matrix disposed between adjacent photoresist blocks;
an optically thinner medium film disposed on the photoresist blocks and the black matrix;
an overcoat layer covering the photoresist blocks, the black matrix, and the optically thinner medium film, wherein the optically thinner medium film covers a boundary between the photoresist blocks and the black matrix; and
a substrate, wherein the photoresist blocks and the black matrix are disposed on a same side of the substrate, and the optically thinner medium film is disposed on a side of the photoresist blocks and the black matrix away from the substrate;
wherein a refractive index of the optically thinner medium film is less than a refractive index of the overcoat layer; and
wherein the refractive index of the optically thinner medium film satisfies: $n = n_{OC} \times \sin i_{incidence}$, wherein n is the refractive index of the optically thinner medium film, $n_{OC}$ is the refractive index of the overcoat layer, and $i_{incidence}$ is a preset incident critical angle.

12. The color filter substrate according to claim 11, wherein the refractive index of the overcoat layer ranges between 1.5 and 1.6.

13. The color filter substrate according to claim 12, wherein the refractive index of the overcoat layer is 1.55.

14. The color filter substrate according to claim 11, wherein the photoresist blocks comprise a red photoresist block, a green photoresist block, and a blue photoresist block disposed in sequence.

15. The color filter substrate according to claim 11, wherein material of the substrate comprises glass or a transparent flexible material.

* * * * *